H. J. PRESTON.
ELECTRICAL DEVICE FOR HEATING LIQUIDS AND THE LIKE.
APPLICATION FILED MAR. 19, 1921.
1,428,803.
Patented Sept. 12, 1922.
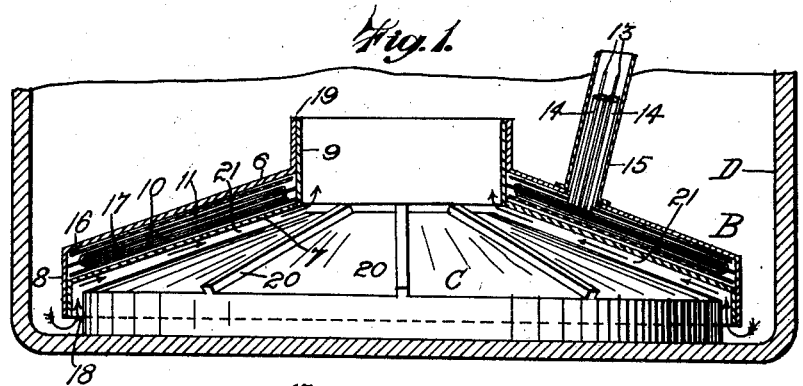
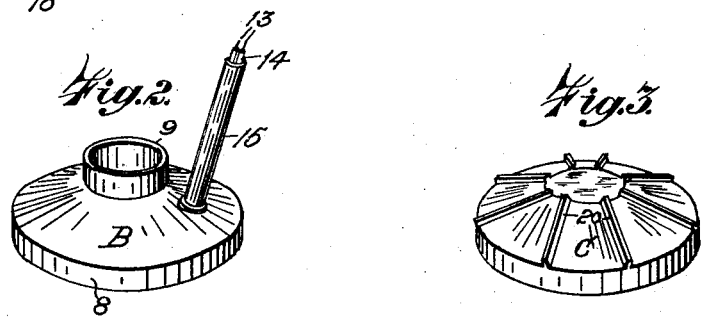
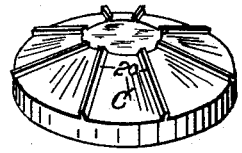
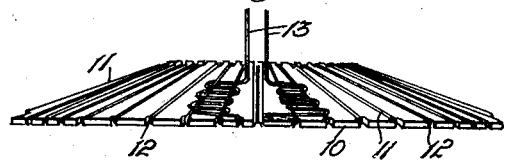
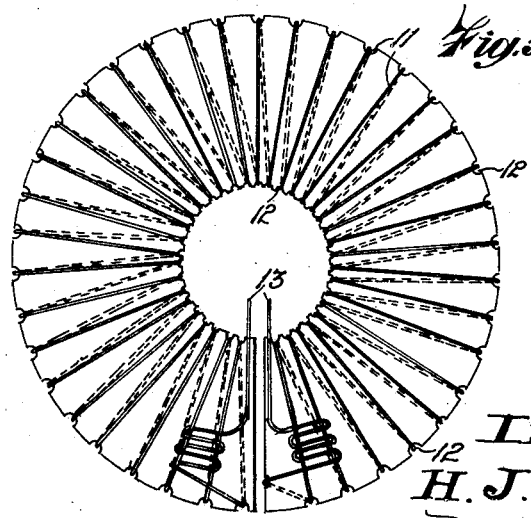
Inventor
H. J. Preston,
By Marks & Clerk
Attys.

Patented Sept. 12, 1922.

1,428,803

UNITED STATES PATENT OFFICE.

HERBERT JAMES PRESTON, OF SYDNEY, NEW SOUTH WALES, AUSTRALIA.

ELECTRICAL DEVICE FOR HEATING LIQUIDS AND THE LIKE.

Application filed March 19, 1921. Serial No. 453,816.

*To all whom it may concern:*

Be it known that I, HERBERT JAMES PRESTON, a subject of the King of Great Britain and Ireland, residing at Sydney, in the State of New South Wales, Commonwealth of Australia, have invented certain new and useful Improvements in Electrical Devices for Heating Liquids and the like, of which the following is a specification.

This invention relates to electric heating units and the object of the invention is to provide a heating device suitable for use in a vessel such as a kettle, saucepan or such like container to heat or boil water or other liquids. A further object of the invention is to provide a heating device which can be removed from the vessel and which can be easily cleaned. Another object is to provide a heating device by means of which a continuous circulation of the surrounding liquid is created immediately the electric current is switched on, thus ensuring economy of current and the rapid heating of the liquid contained in the vessel.

A feature of the invention is its simplicity of construction, and the durability of the heating unit. The invention comprises a hollow truncated double walled metal cone body having between the said walls a corresponding mica cone on which is radially wound a high resistance wire or ribbon the free ends of which are insulated from each other and pass through a metal tube leading from the outer wall of cone body; an insulating cone on each side of the resistance wire within the cone body; and a sealed flange around the base and top of said cone body. The heat unit rests on a cone shaped stand that has radial ridges or projections on its upper face, so that an annular space is left between the inner wall of the heat unit and the outer face of the stand.

The cone stand may be either movable or formed by stamping as an integral part of the bottom of the vessel in which the heat unit is to be used.

But in order that the invention may be clearly understood reference will now be made to the drawings which accompany and form part of this complete specification and in which:—

Figure 1 is a sectional elevation showing the heat unit resting on its stand within a vessel.

Figure 2 is a reduced perspective of heat unit.

Figure 3 is a perspective of stand removed from vessel.

Figure 4 is a side elevation of mica cone with resistance wire wound thereon.

Figure 5 is a plan of Figure 4.

The cone body B is formed with an outer wall 6 and an inner wall 7 each of which is extended at the base and at the top to form flanges 8 and 9. Centrally positioned between the walls 6 and 7 is a mica cone 10 on which is radially wound a high resistance wire 11. The method of winding the resistance wire 11 on mica cone 10 is illustrated in Figures 4 and 5. Notches 12 are cut around the base and top edges of cone 10 and the wire is wound so as to lie in these notches, the free ends 13 passing through insulating tubes 14 within a metal tube 15 which extends from the outer wall of cone body B. Insulating mica cones 16 and 17 are provided one on each side of the wired cone 10 within the cone body B. When the walls 6 and 7 of cone body B are pressed as closely together as possible the edges 18 and 19 of the projecting flanges 8 and 9 are brazed or sweated with solder, or otherwise hermetically sealed, as is also the top of the tube 15 so as to render the cone body B absolutely water-tight. The terminal wires 13 which project from the tube 15 are connected in the ordinary way to the electric main and are provided with the usual control fittings according to the requirements.

The heat unit fits over and rests on a truncated conical stand C which may either be an integral part of the bottom of the vessel or as shown in the drawing a separate piece which can be removed from the vessel, but of sufficient weight to adapt it to rest stationary on the bottom. The stand C has radial ridges 20 or other equivalent projections on which the heat unit rests thus leaving an annular space 21 between the heat unit and the stand through which a thin layer of liquid circulates.

The tube 15 through which the wire terminals 13 pass may project through the lid of the containing vessel D, and be attached to same, or it may pass through a slot therein so that the lid can be removed without interfering with the device.

I claim,

1. An improved electric heating device comprising in combination a hollow truncated double walled metal cone body, flanges at base and top of said body, hermetically sealed together, a cone shaped mica element situated therein, a high resistance wire wound radially thereon, a metal tube secured to the cone body through which pass the ends of said wire and insulating cones arranged one on each side of the resistance wire within the said cone body substantially as and for the purpose herein set forth.

2. An improved electric heating device as claimed in claim 1, in combination with a removable conical stand, and projecting ridges thereon, said stand adapted to rest in the bottom of a containing vessel.

3. An improved electric heating device as claimed in claim 1, in combination with a containing vessel, an inwardly projecting truncated cone shaped stand formed integrally on the bottom of said vessel, and projecting ridges upon said stand.

In testimony whereof he has affixed his signature in presence of two witnesses.

HERBERT JAMES PRESTON.

Witnesses:
  T. C. ALLEN,
  W. ALLEN.